Nov. 8, 1966      E. GORDON      3,283,649
SHUTTER DEVICES FOR VIEWERS AND PROJECTORS
Filed Jan. 14, 1964       2 Sheets-Sheet 1

INVENTOR,
ELIAS GORDON,
BY
ATTORNEY

Nov. 8, 1966    E. GORDON    3,283,649
SHUTTER DEVICES FOR VIEWERS AND PROJECTORS
Filed Jan. 14, 1964    2 Sheets-Sheet 2
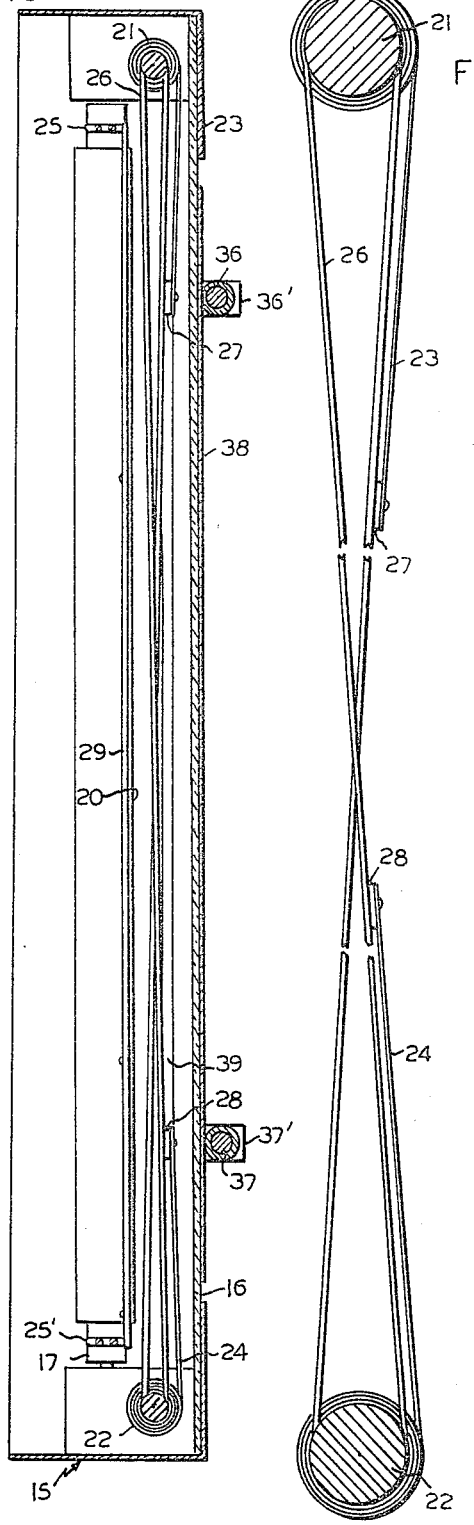
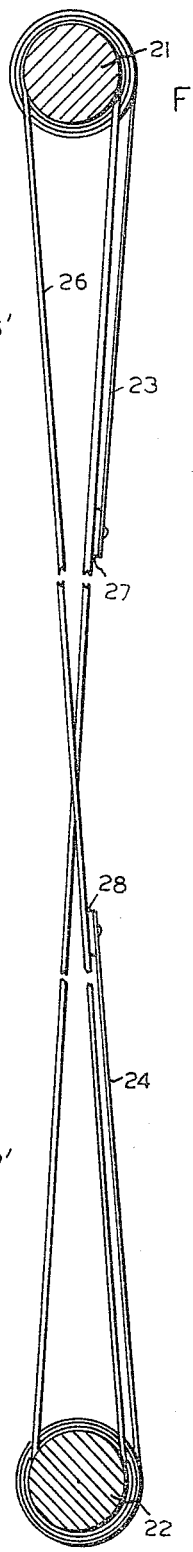
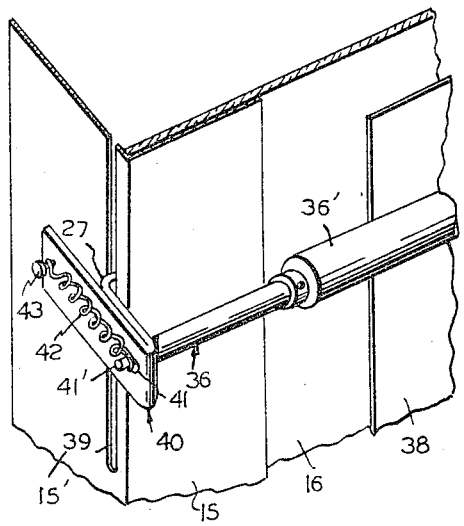
INVENTOR,
ELIAS GORDON,
BY
ATTORNEY.

3,283,649
SHUTTER DEVICES FOR VIEWERS AND PROJECTORS
Elias Gordon, 131 E. 93rd St., New York, N.Y.
Filed Jan. 14, 1964, Ser. No. 337,674
15 Claims. (Cl. 88—24)

The present invention relates to shutter devices for viewers and projectors used for instance for the study of X-ray films and more particularly to a shutter whose opening is adjustable.

An object of this invention is to provide a novel and improved shutter of the character mentioned, offering a variable rectangular opening as well as holdig means for the film to be viewed or projected and though components of such holding means are carried by moving parts of the shutter, the film will not move, wrinkle or curl while the shutter is manipulated to change its opening.

Another object thereof is to provide a novel and improved construction for a combined adjustable shutter and film holder of the nature described which permits the film to be manually shifted without changing the shutter setting and even while the shutter is being adjusted. Film movement will not affect the shutter and shutter movement will not affect the film position.

A further object of this invention is to provide an adjustable shutter of the kind set forth whose opening is constantly symmetrical in relation to a fixed center point.

Another object thereof is to provide a novel and improved shutter of the nature described, affording independent adjustment of each of the dimensions of its opening.

Still another object thereof is to provide a novel and improved combined adjustable shutter and film holder having the attributes mentioned, which is simple in construction, reasonable in cost to manufacture, easy to adjust from a single region of control and which is efficient in carrying out the purposes for which it is designed.

Other objects and advantages will become apparent as this disclosure proceeds.

For one practice of this invention, it may consist of a rectangular transparent pane in a frame, on the back of which, along each edge thereof, is a rotatably mounted roller having a shade wound thereon from which it can unwind across the pane. Each set of opposite rollers is connected by endless belts; the flights of each belt being crossed so that upon the rotation of one roller, its companion roller will rotate in the opposite direction. The lead edge of each shade carries a stiff member therealong, the ends of which are appropriately connected to the flights of the belts. The ends of the stiff members along the lead ends of one set of shades, extend through guide slots in opposite side walls of the frame to be exterior the frame, where they are bent forward to extend a predetermined distnce beyond the plane of the pane and there serve as bearings for resiliently mounted rollers which are biased to press against the front surface of said pane. Hence, each of the shades of this particular set carries one such pressing roller. A film to be viewed or projected is placed against the pane's front surface so it is pressed thereagainst by said pressing rollers. Means are provided to independently turn one of the shade rollers of each of said sets.

A more detailed description will now be given, for which reference will be had to the accompanying drawings forming part of this specification, in which drawings, similar characters of reference indicate corresponding parts in all the views.

FIG. 3 is a magnified section taken at lines 3—3 in FIG. 2.

FIG. 4 is still a larger view of part of FIG. 3, showing one set of shade rollers with their shades and a crossed belt which connects such rollers as well as the stiff members which are along the lead edges of said shades and attached to the flights of said belt respectively.

FIG. 5 is a fragmentary perspective view showing the manner in which a pressing roller is mounted and how it holds a film against the front pane.

Figure 2:
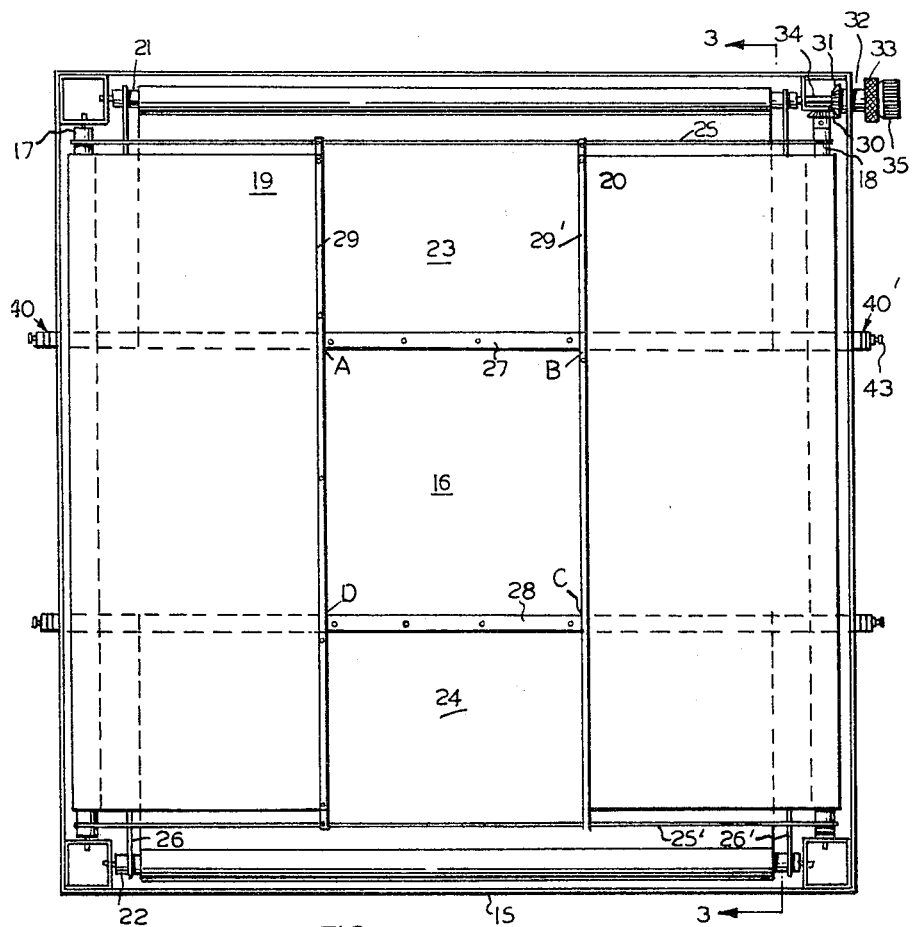
FIG. 2 is an enlarged rear view of said combined shutter and film holder. The belts connecting the shade rollers are here shown diagrammatically.
Figure 1:
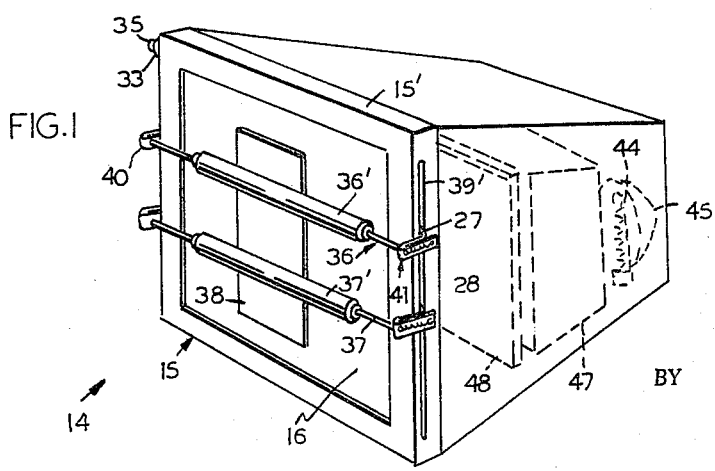
FIG. 1 is a perspective view of a film viewing apparatus equipped with a preferred embodiment of a combined adjustable shutter and film holder constructed in accordance with the teachings of this invention.

The drawing shows that on the back of a rectangular frame 15 holding the transparent pane 16, there is along each edge thereof a rotatably mounted roller having a shade associated therewith to wind up and unwind therefrom, depending in which direction the roller is turned. Hence, there is one set of opposite rollers 17, 18 with their shades 19 and 20 and another set of opposite rollers 21, 22 with their shades 23 and 24; said respective sets being in perpendicular relation. The rollers 17 and 18 are connected by the endless belts 25, 25' and the rollers 21, 22 are connected by the endless belts 26, 26'; in each said belts, its flights are crossed so that upon rotation of one of the rollers of any set, its companion roller will rotate in the opposite direction and hence the shades 19, 20 will simultaneously wind up or unwind identically upon the rotation of one of their rollers and the shades 23 and 24 will simultaneously wind up or unwind identically upon the rotation of one of their rollers. The leading edges of each of the shades have a stiff member therealong respectively, which extend beyond the side edges of such shades respectively, to the belts on their rollers where such extensions are secured, one to one flight and the other to the other flight of each of said belts on the rollers of its shades; the attachment of each leading-edge stiffener being to corresponding points on the belts of the associated rollers. The stiff member 29 on the leading edge of the shade 19, has its ends attached at corresponding points on the belts 25, 25'. The stiff member 29' on the leading edge of the shade 20, has its ends attached at corresponding points on the belts 25, 25', which are on the flights other than to which the member 29 are attached. The stiff members 27 and 28, strip material, along the respective leading edges of the shades 23 and 24, are associated with the belts 26, 26' in like manner as the members 29 and 29' are associated with the belts 25, 25'. In order that the center of the rectangle enclosed by the lead members shall always be the center of the pane 16, the points of attachment of the companion members 29, 29' on the belts 25, 25' are equidistant from points of crossing of the flights of said belts. The same is true with respect to the companion members 27, 28 and their points of attachment to the belts 26, 26'. It is evident that the rectangle A, B, C, D is the shutter opening for light directed from behind the shades of a viewer or projector fitted with the assembly shown in the drawing, to be its shutter mechanism. Making the frame with a rearward perimetral flange 15', permits mounting thereof on present view boxes, for which the frame will be manufactured to be of proper size to be so fitted. The adaptation of this shutter apparatus in viewers and projectors and the like can be readily done by those versed in the art, without further explanation or illustration.

In the embodiment illustrated, provision is made to independently turn the rollers 18 and 21 from one region of control, for changing the shutter opening. A preferred way, is to have a bevel gear 30 which is secured on the roller 18, to be in engagement with the companion bevel gear 31 which is secured to a tubular shaft 32; the latter being journalled through the frame 15 and carries secured thereon the control knob 33 on the outside. The shaft 34 of the roller 21 extends through the tubular shaft 32 and outward of the knob 33, where it securely carries the control knob 35. It is apparent that to change the shutter opening A, B, C, D, adjustment is made by manipulating the control knobs 33 and 35 as is required.

As part of the unitary structure shown in FIG. 2, the rollers 36 and 37 are provided across the front of the framed pane 16, to hold for instance an X-ray film 38, flat against the pane's front surface, so its showings could be studied upon operation of the viewer 14 or projection apparatus employing the shutter described herein. These rollers 36, 37 are mounted respectively on the stiff strip members 27 and 28, parallel to the rollers 21 and 22. These stiff members extend through track slots indicated by the numerals 39, 39′ in the side walls of the frame 15 and are bent forwardly outside the frame to make the bearings 40, 40′ for the end pintles as 41′ of said rollers 36, 37. These pintles ride in slots as 41, extend therethrough and serve as an anchor for one end of a tensed tension coil spring as 42 whose other end is anchored to a pin as 43 extending from the bearing structure. This makes the mounting of each of said rollers 36 and 37 resilient and biased to press against the pane 16. It is preferred that the actual roller portion which contacts the pane shall be a rotatable sleeve; said sleeves being denoted by the numerals 36′ and 37′ and it is these that make contact with the film 38, pressing it against the pane 16. This resiliency may be offered for insertion of the film and the subsequent action thereagainst by the pressing rollers by having said sleeves of suitable rubber.

Assuming the apparatus of FIG. 2 serving as the shutter means of a viewer or projector, the film or other transparency 38 to be studied, is inserted between the rotatable sleeves 36′, 37′ and the pane 16, so that said sleeves will press the film against said pane. Now determine what part of the film is to be viewed and shift the film so that such part is about central of the pane 16. Now turn the knob 35 in a proper direction to bring the leading edges of the shades 23 and 24 to opposite limits of such chosen area or nearly so. Then turn the knob 33 in a proper direction to bring the leading edges of the shades 19 and 20 to the opposite sides or the other limits of such chosen area or nearly so and shift the film 38 to bring the chosen area thereof within the shutter opening thus effected, making any further adjustments with the knobs 33 and 35 as may be required, and of course, the film may be shifted in any direction in its plane. It is important to note that though the film is free of manual hold, its position on the pane 16 will not change while the distance between the rollers 36, 37 is changed by manipulation of the control knob 35. When the shutter opening A, B, C, D and the position of the film 38 have been adjusted as desired, the light source of the viewer or projector is then operated and the switch therefor may be located near the control knobs in total machines to be manufactured, so that the operator shall have all his controls in one region.

When the rollers 36, 37 are moving away from each other upon turning the control knob 35, the possible drag on the film 38 in one direction will be neutralized by an equal drag in the opposite direction and so the film will not move and remain flat. The same is true while said pressing rollers move towards each other. The strengths of the springs 42 are chosen to make it easy to insert the film against the pane 16 and behind the sleeves 36′, 37′ which turn freely so that the film will remain free of wrinkles and being across the film along spaced lines, the film will not curl.

The shades 19, 20, 23 and 24 which shield the pane 16 to the extent that they cover it, are of opaque material and pliable; their inner ends being suitably secured to their respective rollers 17, 18, 21 and 22 so that they could be wound up thereon.

The shutter herein disclosed affords change of both dimensions of its rectangular opening. For use in apparatus requiring change of only one dimension of a rectangular opening, my present shutter device would be minus the shades 19, 20, their rollers and drives.

In all uses of my shutter, the film 38 is shiftable from one position to another against the pane 16, to successively set desired areas thereof within the confines of a definite shutter opening A, B, C, D. The film is easily set against the pane, because the rollers 36, 37 yield forwardly in the bearing slots as 41 and it can be manually shifted in any direction in its plane even while the control knob 35 is manipulated to move the shades 23, 24 and hence cause the rollers 36 and 37 to move apart or towards each other.

It is evident that one hand held at the control knobs 33, 35 can turn them singly to change the dimensions A, B or B, C of the opening A, B, C, D as required, or such hand can turn said knobs jointly in one direction to make such opening smaller, or jointly in the other direction to enlarge such opening. Such joint turning of said knobs will either simultaneously shorten or lengthen said dimensions A, D and B, C. Of course, the other hand is always free during any of the described manipulations, to adjust the film 38.

It may be noted that in the viewer 14, its light source may be furnished by one or more "iodine" bulbs as 44, each of which is provided with a reflector as 46. The light passes through a tank of liquid 47 where it is cooled and then after passing through a ground glass translucent pane 48, it is thereafter limited by the opening A, B, C, D offered by the shutter and then to illuminate the selected portion of the film 38 to be observed. Those versed in the art will readily adapt the shutter device of FIG. 2 to projection apparatus, without further illustration.

This invention is capable of numerous forms and various applications without departing from the essential features herein disclosed. It is therefore intended and desired that the embodiment shown herein shall be deemed merely illustrative and not restrictive and that the patent shall cover all patentable novelty herein set forth; reference being had to the following claims rather than to the specific description herein to indicate the scope of this invention.

I claim:

1. In a shutter device of the character described, the combination of a frame holding a transparent pane, two parallel rollers rotatably mounted in spaced relation on said frame behind said pane, two pliable opaque shades, one carried by each of said rollers respectively, to unwind and wind up thereon; the lead edges of said shades being between said shade rollers, stiff members mounted one along the lead edge of each of said shades, means supporting said stiff members so that the unwound portions of the shades shield said pane; the ends of said lead members having lateral extensions extending forwardly of said pane, a pair of rotatable rollers positioned across the front of said pane in parallel relation to said shade rollers, in pressing contact with the front surface of said pane and provided with means so that they yield to afford admission of a film to lie with its rear surface against the front surface of said pane whereby said pressing rollers will be in pressing contact with the front surface of such film; one of these front rollers being on the extensions from one of said lead members and the other of said front rollers being on the extensions from the other of said lead members, means to turn said shade rollers to wind up said shades and means to shift said stiff members relatively towards each other to unwind said shades.

2. A shutter device as defined in claim 1, wherein the means to support and shift the stiff members includes an endless belt connecting said rollers which have the shades thereon; the flights of said belt crossing each other and secured to said stiff members respectively; said shade rollers being identical and the distances from the lead edge of each shade to the axis of the roller it is on being equal.

3. A shutter device as defined in claim 1, including two additional parallel shade rollers rotatably mounted in angular relation to the other shade rollers and in spaced relation on the frame behind said pane, two additional pliable opaque shades, carried by said additional shade rollers respectively, to wind up and unwind thereon respectively; the lead edges of said additional shades being between said additional shade rollers and in intersecting relation with both said stiff members, additional stiff members mounted along the lead edges of said additional shades respectively, means supporting said additional stiff members so that the unwound portions of said additional shades shield said pane, means to turn said additional shade rollers to wind up said additional shades and means to shift said additional stiff members relatively towards each other to unwind said additional shades.

4. A shutter device as defined in claim 3, wherein said shifting means causes both additional stiff members to move simultaneously and both of the other stiff members simultaneously when respectively actuated.

5. A shutter device as defined in claim 3, wherein said intersecting relation is substantially 90 degrees.

6. A shutter device as defined in claim 3, wherein the pane is rectangular and the shade rollers are along the edges of said pane respectively.

7. A shutter device as defined in claim 3, wherein opposite shade rollers are identical and the distances from the lead edges of opposite shades to the respective axes of the rollers they are associated with respectively are equal; the means to support and shift the additional stiff members being a first endless belt connecting said additional shade rollers; the flights of said first belt crossing each other and secured to the additional stiff members respectively; the means to support and shift the other stiff members being a second endless belt connecting the other shade rollers; the flights of said second belt crossing each other and secured to such other stiff members respectively.

8. A shutter device as defined in claim 7, wherein the pane is rectangular and the shade rollers are along the edges of said pane respectively.

9. A shutter device as defined in claim 7, wherein the means to turn the shade rollers comprises an accessible manually-graspable first element fixed on an extension of one of the shade rollers, a sleeve rotatably mounted on said extension, a second accessible, manually-graspable element fixed on said sleeve; said elements being near each other and gearing means connecting said sleeve and the nearest shade roller which is in angular relation therewith.

10. A shutter device as defined in claim 9, wherein said elements are knobs.

11. A shutter device as defined in claim 9, wherein said gearing means comprises two bevel gears, one secured to said sleeve and the other secured to said nearest shade roller; said gears being in meshed engagement.

12. In a shutter device of the character described, the combination of a frame holding a transparent pane, shielding members movably mounted on the frame and positioned that each shields a different part of said pane; an edge of one of said shielding members being along an edge of the other shielding member; each of said shielding members having extensions extending from near said edges to in front of said pane, a rotatable roller carried across the front of the pane, on the extensions from one of said shielding members, another rotatable roller carried across the front of the pane on the extensions from the other shielding member; both said rollers being parallel to each other and perpendicular to the line of movement of said shielding members and also in pressing contact with the front surface of the pane and adapted to yield to afford the admission of a film to lie with its rear surface against the front surface of said pane and its front surface to be pressed on by said rollers; said shielding members being relatively movable along a straight line whereby said edges move away and towards each other.

13. A shutter device as defined in claim 12, including means for moving said shielding members in opposite directions simultaneously.

14. A shutter device as defined in claim 1, including means for moving said stiff members in opposite directions simultaneously so that they move towards and away from each other.

15. A shutter device as defined in claim 1, wherein the shifting means when actuated, will move the stiff members apart simultaneously and when the means to turn the shade rollers is actuated, such rollers will turn simultaneously to wind up the shades.

References Cited by the Examiner
UNITED STATES PATENTS

| 1,813,689 | 7/1931 | Weisker | 88—24 |
| 2,378,933 | 6/1945 | Klemm et al. | 88—24 |

NORTON ANSHER, *Primary Examiner.*

RICHARD A. WINTERCORN, *Assistant Examiner.*